US012262237B2

(12) United States Patent
Koskela et al.

(10) Patent No.: US 12,262,237 B2
(45) Date of Patent: Mar. 25, 2025

(54) WIRELESS COMMUNICATION SYSTEM

(71) Applicant: Nokia Technologies Oy, Espoo (FI)

(72) Inventors: Timo Koskela, Oulu (FI); Sami-Jukka Hakola, Kempele (FI); Lars Dalsgaard, Oulu (FI); Juha Pekka Karjalainen, Oulu (FI); Mihai Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 254 days.

(21) Appl. No.: 17/767,589

(22) PCT Filed: Oct. 14, 2019

(86) PCT No.: PCT/EP2019/077727
§ 371 (c)(1),
(2) Date: Apr. 8, 2022

(87) PCT Pub. No.: WO2021/073708
PCT Pub. Date: Apr. 22, 2021

(65) Prior Publication Data
US 2023/0146882 A1 May 11, 2023

(51) Int. Cl.
*H04W 4/00* (2018.01)
*H04W 24/08* (2009.01)
*H04W 24/10* (2009.01)

(52) U.S. Cl.
CPC ........... *H04W 24/10* (2013.01); *H04W 24/08* (2013.01)

(58) Field of Classification Search
None
See application file for complete search history.

(56) References Cited

U.S. PATENT DOCUMENTS

| 2019/0253964 | A1 | 8/2019 | Li et al. | |
|---|---|---|---|---|
| 2020/0305168 | A1* | 9/2020 | Liou | ..................... H04W 76/11 |

FOREIGN PATENT DOCUMENTS

WO   2019/099659 A1   5/2019

OTHER PUBLICATIONS

"3rd Generation Partnership Project; Technical Specification Group Radio Access Network; NR; Physical layer procedures for control (Release 15)", 3GPP TS 38.213, V15.6.0, Jun. 2019, pp. 1-107.

(Continued)

*Primary Examiner* — Zewdu A Beyen
(74) *Attorney, Agent, or Firm* — Robert P. Michal, Esq.; Carter, DeLuca & Farrell LLP

(57) ABSTRACT

An apparatus for a terminal has means for storing a first configuration for measurement reporting on downlink reference signals, wherein one or more downlink reference signals correspond to one of a plurality of states for a first channel. The apparatus also has means for receiving an activation of a first state of the plurality of states for the first channel, and determining a second configuration for measurement reporting based on the first configuration for measurement reporting and the received activation of the first state, wherein the second configuration for measurement reporting configures the terminal to report measurements on a first downlink reference signal corresponding to the first state.

1 Claim, 10 Drawing Sheets

(56) References Cited

OTHER PUBLICATIONS

"3rd Generation Partnership Project; Technical Specification Group Radio Access Network; NR; Physical layer procedures for data (Release 15)", 3GPP TS 38.214, V15.6.0, Jun. 2019, pp. 1-105.

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

"3rd Generation Partnership Project; Technical Specification Group Radio Access Network; NR; Multiplexing and channel coding (Release 15)", 3GPP TS 38.212, V15.6.0, Jun. 2019, pp. 1-101.

International Search Report and Written Opinion received for corresponding Patent Cooperation Treaty Application No. PCT/EP2019/077727, dated Dec. 9, 2019, 14 pages.

"[S035] Discussion on simplification of CSI-MeasConfig", 3GPP TSG-RAN2#101, R2-1802458, Agenda: 10.4.3.2, Samsung, Feb. 26-Mar. 2, 2018, 7 pages.

"Remaining issues and text proposals on beam measurement and reporting", 3GPP TSG RAN WG1 Meeting AH 1801, R1-1800185, Agenda: 7.2.2.3, vivo, Jan. 22-26, 2018, 9 pages.

Office action received for corresponding European Patent Application No. 19789634.3, dated Aug. 6, 2024, 3 pages.

\* cited by examiner

WIRELESS COMMUNICATION SYSTEM

RELATED APPLICATION

This application claims priority to PCT Application No. PCT/EP2019/077727, filed on Oct. 14, 2019, each of which is incorporated herein by reference in its entirety.

FIELD

The present application relates to a method, apparatus, and computer program.

BACKGROUND

A communication system can be seen as a facility that enables communication sessions between two or more entities such as user terminals, base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided an apparatus, for a terminal, comprising means for: storing a first configuration for measurement reporting on downlink reference signals, wherein one or more downlink reference signals correspond to one of a plurality of states for a first channel; receiving an activation of a first state of the plurality of states for the first channel; and determining a second configuration for measurement reporting based on the first configuration for measurement reporting and the received activation of the first state, wherein the second configuration for measurement reporting configures the terminal to report measurements on a first downlink reference signal corresponding to the first state.

The state of the plurality of states may comprise a transmission configuration indication, TCI, state.

The first channel may comprise at least one of a physical downlink control channel, PDCCH, and a physical downlink shared channel, PDCSH.

The means for storing may be for firstly receiving the first configuration for measurement reporting via radio resource control, RRC, signalling.

The means may be for causing a measurement report to be transmitted to a network, wherein the measurement report includes one or more measurements of the first downlink reference signal.

The one or more measurements may be channel state information, CSI, measurements.

The first and/or second configuration for measurement reporting may comprise an indication for the apparatus to report periodically to the network.

The first and/or second configuration for measurement reporting may comprise an indication for the apparatus to report aperiodically to the network, when provided with a trigger from the network.

The first configuration for measurement reporting may comprise a reporting set of downlink reference signals to be measured and reported, and wherein the means for determining a second configuration for measurement reporting may be further for updating the reporting set to comprise the first downlink reference signal corresponding to the first state.

The means for receiving an activation is for receiving an activation of more than one states of the a plurality of states for the first channel, and wherein the means for determining a second configuration for measurement reporting may be for determining a second configuration for measurement reporting based on the received activation of the more than one states, wherein the second configuration for measurement reporting configures the terminal to report measurements on more than one reference signals corresponding to the received activation of the more than one states.

The means for determining a second configuration for measurement reporting may be for determining the second configuration for measurement reporting to configure the terminal to report measurements on a reference signal that is quasi co-located with the reference signal corresponding to the first state.

The means for receiving an activation may receive the activation at a medium access control level.

The means for receiving an activation may be via a medium access control address control element, MAC CE, and/or via a downlink control information element.

According to an aspect, there is provided an apparatus, for a network entity, comprising means for: causing a transmission of a first configuration, for a further apparatus, for measurement reporting on downlink reference signals, wherein one or more downlink reference signals correspond to one of a plurality of states for a first channel; causing a signalling of an activation of a first state of the plurality of states for the first channel, such that the further apparatus can determine a second configuration for measurement reporting based on the first configuration for measurement reporting and the activation of the first state; and receiving a measurement report, from the further apparatus, with measurements on a first downlink reference signal corresponding to the first state.

The state of the plurality of states may comprise a transmission configuration indication, TCI, state.

The first channel may comprise at least one of a physical downlink control channel, PDCCH, and a physical downlink shared channel, PDCSH.

The means for causing a transmission of a first configuration may be via radio resource control, RRC, signalling.

The measurements on the first downlink reference signal may be channel state information, CSI, measurements.

The first and/or second configuration for measurement reporting may comprise an indication for the further apparatus to report periodically to the apparatus.

The first and/or second configuration for measurement reporting may comprise an indication for the further apparatus to report aperiodically to the apparatus, when provided with a trigger from the apparatus.

The first configuration for measurement reporting may comprise a reporting set of downlink reference signals to be measured and reported.

The means for causing a transmission of a signal indicating an activation may be for causing a transmission of a signal indicating an activation of more than one states of the a plurality of states for the first channel, such that the further apparatus can determine a second configuration for measurement reporting based on the first configuration and the activation of the more than one states, so to report measurements on more than one reference signals corresponding to the activation of the more than one states.

The signalling may comprise an indication for the further apparatus to report a reference signal which is quasi co-located with the reference signal corresponding to the first state.

The means for causing a signalling may be at a medium access control level.

The means for causing a signalling may be via a medium access control address control element, MAC CE, and/or via a downlink control information element.

The further apparatus may comprise a terminal device.

According to an aspect, there is provided a method performed by a terminal, comprising: storing a first configuration for measurement reporting on downlink reference signals, wherein one or more downlink reference signals correspond to one of a plurality of states for a first channel; receiving an activation of a first state of the plurality of states for the first channel; and determining a second configuration for measurement reporting based on the first configuration for measurement reporting and the received activation of the first state, wherein the second configuration for measurement reporting configures the terminal to report measurements on a first downlink reference signal corresponding to the first state.

The state of the plurality of states may comprise a transmission configuration indication, TCI, state.

The first channel may comprise at least one of a physical downlink control channel, PDCCH, and a physical downlink shared channel, PDCSH.

The storing may comprise firstly receiving the first configuration for measurement reporting via radio resource control, RRC, signalling.

The method may comprise causing a measurement report to be transmitted to a network, wherein the measurement report includes one or more measurements of the first downlink reference signal.

The one or more measurements may be channel state information, CSI, measurements.

The first and/or second configuration for measurement reporting may comprise an indication for the terminal to report periodically to the network.

The first and/or second configuration for measurement reporting may comprise an indication for the terminal to report aperiodically to the network, when provided with a trigger from the network.

The first configuration for measurement reporting may comprise a reporting set of downlink reference signals to be measured and reported, and wherein determining a second configuration for measurement reporting may comprise updating the reporting set to comprise the first downlink reference signal corresponding to the first state.

The method may comprise receiving an activation is for receiving an activation of more than one states of the a plurality of states for the first channel, and wherein determining a second configuration for measurement reporting may comprise determining a second configuration for measurement reporting based on the received activation of the more than one states, wherein the second configuration for measurement reporting configures the terminal to report measurements on more than one reference signals corresponding to the received activation of the more than one states.

The determining of a second configuration for measurement reporting may comprise determining the second configuration for measurement reporting to configure the terminal to report measurements on a reference signal that is quasi co-located with the reference signal corresponding to the first state.

The activation may be received at a medium access control level.

The activation may be received via a medium access control address control element, MAC CE, and/or via a downlink control information element.

According to an aspect, there is provided a method performed by a network entity, comprising: causing a transmission of a first configuration, for a further apparatus, for measurement reporting on downlink reference signals, wherein one or more downlink reference signals correspond to one of a plurality of states for a first channel; causing a signalling of an activation of a first state of the plurality of states for the first channel, such that the further apparatus can determine a second configuration for measurement reporting based on the first configuration for measurement reporting and the activation of the first state; and receiving a measurement report, from the further apparatus, with measurements on a first downlink reference signal corresponding to the first state.

The state of the plurality of states may comprise a transmission configuration indication, TCI, state.

The first channel may comprise at least one of a physical downlink control channel, PDCCH, and a physical downlink shared channel, PDCSH.

The step of causing a transmission of a first configuration may be via radio resource control, RRC, signalling.

The measurements on the first downlink reference signal may be channel state information, CSI, measurements.

The first and/or second configuration for measurement reporting may comprise an indication for the further apparatus to report periodically to the apparatus.

The first and/or second configuration for measurement reporting may comprise an indication for the further apparatus to report aperiodically to the apparatus, when provided with a trigger from the apparatus.

The first configuration for measurement reporting may comprise a reporting set of downlink reference signals to be measured and reported.

The step of causing a transmission of a signal indicating an activation may comprise causing a transmission of a signal indicating an activation of more than one states of the a plurality of states for the first channel, such that the further apparatus can determine a second configuration for measurement reporting based on the first configuration and the activation of the more than one states, so to report measurements on more than one reference signals corresponding to the activation of the more than one states.

The signalling may comprise an indication for the further apparatus to report a reference signal which is quasi co-located with the reference signal corresponding to the first state.

The signalling may be at a medium access control level.

The signalling may be via a medium access control address control element, MAC CE, and/or via a downlink control information element.

The further apparatus may comprise a terminal device.

According to an aspect, there is provided an apparatus comprising: at least one processor; and at least one memory including computer program code, the at least one memory and the computer program code configured to, with the at least one processor, cause the apparatus at least to perform: storing a first configuration for measurement reporting on downlink reference signals, wherein one or more downlink reference signals correspond to one of a plurality of states for a first channel; receiving an activation of a first state of the plurality of states for the first channel; and determining a second configuration for measurement reporting based on the first configuration for measurement reporting and the received activation of the first state, wherein the second configuration for measurement reporting configures the terminal to report measurements on a first downlink reference signal corresponding to the first state.

The state of the plurality of states may comprise a transmission configuration indication, TCI, state.

The first channel may comprise at least one of a physical downlink control channel, PDCCH, and a physical downlink shared channel, PDCSH.

The storing may comprise firstly receiving the first configuration for measurement reporting via radio resource control, RRC, signalling.

The method may comprise causing a measurement report to be transmitted to a network, wherein the measurement report includes one or more measurements of the first downlink reference signal.

The one or more measurements may be channel state information, CSI, measurements.

The first and/or second configuration for measurement reporting may comprise an indication for the terminal to report periodically to the network.

The first and/or second configuration for measurement reporting may comprise an indication for the terminal to report aperiodically to the network, when provided with a trigger from the network.

The first configuration for measurement reporting may comprise a reporting set of downlink reference signals to be measured and reported, and wherein determining a second configuration for measurement reporting may comprise updating the reporting set to comprise the first downlink reference signal corresponding to the first state.

The method may comprise receiving an activation is for receiving an activation of more than one states of the a plurality of states for the first channel, and wherein determining a second configuration for measurement reporting may comprise determining a second configuration for measurement reporting based on the received activation of the more than one states, wherein the second configuration for measurement reporting configures the terminal to report measurements on more than one reference signals corresponding to the received activation of the more than one states.

The determining of a second configuration for measurement reporting may comprise determining the second configuration for measurement reporting to configure the terminal to report measurements on a reference signal that is quasi co-located with the reference signal corresponding to the first state.

The activation may be received at a medium access control level.

The activation may be received via a medium access control address control element, MAC CE, and/or via a downlink control information element.

According to an aspect, there is provided an apparatus comprising: at least one processor; and at least one memory including computer program code, the at least one memory and the computer program code configured to, with the at least one processor, cause the apparatus at least to perform: causing a transmission of a first configuration, for a further apparatus, for measurement reporting on downlink reference signals, wherein one or more downlink reference signals correspond to one of a plurality of states for a first channel; causing a signalling of an activation of a first state of the plurality of states for the first channel, such that the further apparatus can determine a second configuration for measurement reporting based on the first configuration for measurement reporting and the activation of the first state; and receiving a measurement report, from the further apparatus, with measurements on a first downlink reference signal corresponding to the first state.

The state of the plurality of states may comprise a transmission configuration indication, TCI, state.

The first channel may comprise at least one of a physical downlink control channel, PDCCH, and a physical downlink shared channel, PDCSH.

The step of causing a transmission of a first configuration may be via radio resource control, RRC, signalling.

The measurements on the first downlink reference signal may be channel state information, CSI, measurements.

The first and/or second configuration for measurement reporting may comprise an indication for the further apparatus to report periodically to the apparatus.

The first and/or second configuration for measurement reporting may comprise an indication for the further apparatus to report aperiodically to the apparatus, when provided with a trigger from the apparatus.

The first configuration for measurement reporting may comprise a reporting set of downlink reference signals to be measured and reported.

The step of causing a transmission of a signal indicating an activation may comprise causing a transmission of a signal indicating an activation of more than one states of the a plurality of states for the first channel, such that the further apparatus can determine a second configuration for measurement reporting based on the first configuration and the activation of the more than one states, so to report measurements on more than one reference signals corresponding to the activation of the more than one states.

The signalling may comprise an indication for the further apparatus to report a reference signal which is quasi co-located with the reference signal corresponding to the first state.

The signalling may be at a medium access control level.

The signalling may be via a medium access control address control element, MAC CE, and/or via a downlink control information element.

The further apparatus may comprise a terminal device.

According to an aspect, there is provided a computer readable medium comprising program instructions thereon for performing at least the following: storing a first configuration for measurement reporting on downlink reference signals, wherein one or more downlink reference signals correspond to one of a plurality of states for a first channel; receiving an activation of a first state of the plurality of states for the first channel; and determining a second configuration for measurement reporting based on the first configuration for measurement reporting and the received activation of the first state, wherein the second configuration for measurement reporting configures the terminal to report measurements on a first downlink reference signal corresponding to the first state.

According to an aspect, there is provided a computer readable medium comprising program instructions thereon for performing at least the following: causing a transmission of a first configuration, for a further apparatus, for measurement reporting on downlink reference signals, wherein one or more downlink reference signals correspond to one of a plurality of states for a first channel; causing a signalling of an activation of a first state of the plurality of states for the first channel, such that the further apparatus can determine a second configuration for measurement reporting based on the first configuration for measurement reporting and the activation of the first state; and receiving a measurement report, from the further apparatus, with measurements on a first downlink reference signal corresponding to the first state.

A computer product stored on a medium may cause an apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

DESCRIPTION OF FIGURES

Embodiments will now be described, by way of example only, with reference to the accompanying Figures in which.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
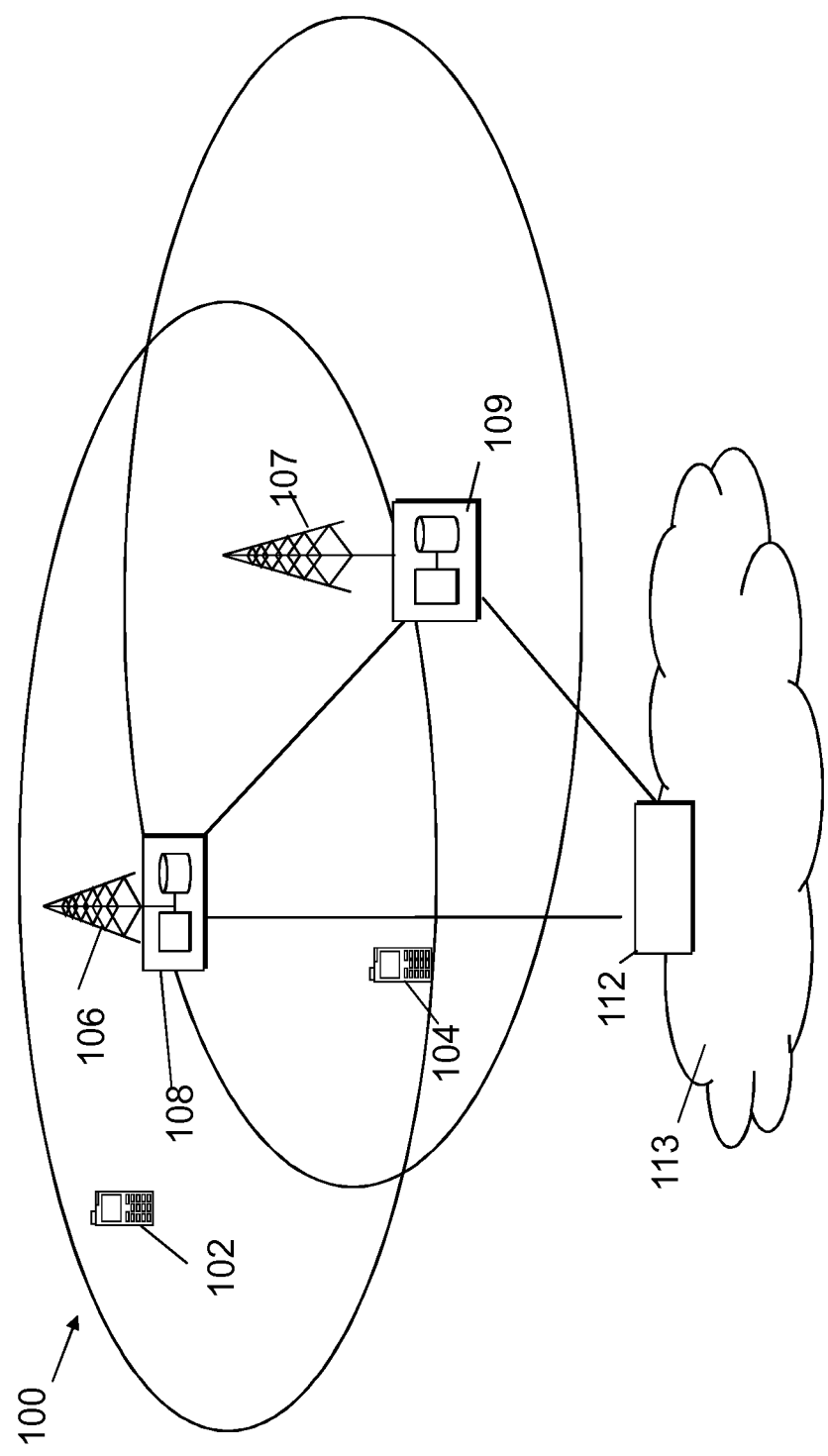
FIG. 1 shows a schematic diagram of an example communication system comprising a plurality of base stations and a plurality of communication devices.

In a wireless communication system 100, such as that shown in FIG. 1, mobile communication devices/terminals such or user apparatuses, and/or user equipments (UE), and/or machine-type communication devices 102, 104 are provided wireless access via at least one base station or similar wireless transmitting and/or receiving node or point. A communication device is provided with an appropriate signal receiving and transmitting apparatus for enabling communications, for example enabling access to a communication network or communications directly with other devices. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved.

A base station may be referred to more generally as simply a network apparatus or a network access point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

In FIG. 1, base stations 106 and 107 are shown as connected to a wider communications network 113 via a gateway 112. A further gateway function may be provided to connect to another network.

There may be smaller base stations or cells (not shown) in some networks. These may be pico or femto level base stations or the like.

Figure 2:
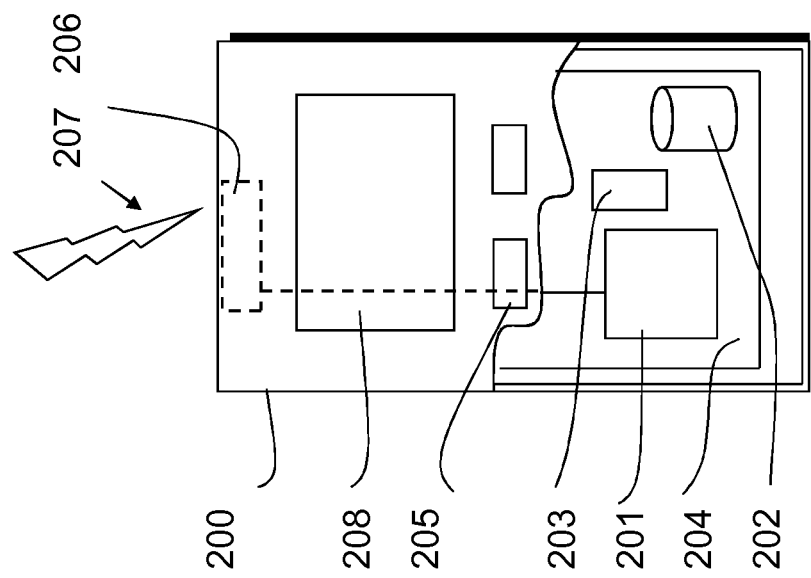
FIG. 2 shows a schematic diagram of an example communication device.

A possible communication device will now be described in more detail with reference to FIG. 2 showing a schematic, partially sectioned view of a communication device 200. Such a communication device may be a user equipment (UE) or terminal. An appropriate communication device may be provided by any device capable of sending and receiving radio signals. Non-limiting examples comprise a mobile station (MS) or mobile device such as a mobile phone or what is known as a smart phone, a computer provided with a wireless interface card or other wireless interface facility (e.g., USB dongle), personal data assistant (PDA) or a tablet provided with wireless communication capabilities, a machine type device or any combinations of these or the like.

The device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement.

The antenna arrangement may be arranged internally or externally to the communication device.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. This may be optional in some embodiments.

A display 208, a speaker and a microphone can be also provided. One or more of these may be optional in some embodiments.

A communication device may comprise appropriate connectors (either wired or wireless) to other devices and/or for connecting external accessories, for example hands-free equipment, thereto. One or more of these may be optional.

The communication devices may access the communication system based on various access techniques.

An example of wireless communication systems are architectures standardized by the 3rd Generation Partnership Project (3GPP). A latest 3GPP based development is often referred to as 5G or New Radio (NR). The previous 3GPP based developments are often referred to as different generations for example 2G, 3G, 4G. Other examples of radio access system comprise those provided by base stations of systems that are based on technologies such as wireless local area network (WLAN) and/or WiMAX (Worldwide Interoperability for Microwave Access). It should be appreciate that although some embodiments are described in the context of a 4G and/or 5G system, other embodiments may be provided in any other suitable system including but not limited to subsequent systems or similar protocols defined outside the 3GPP forum.

Figure 3:
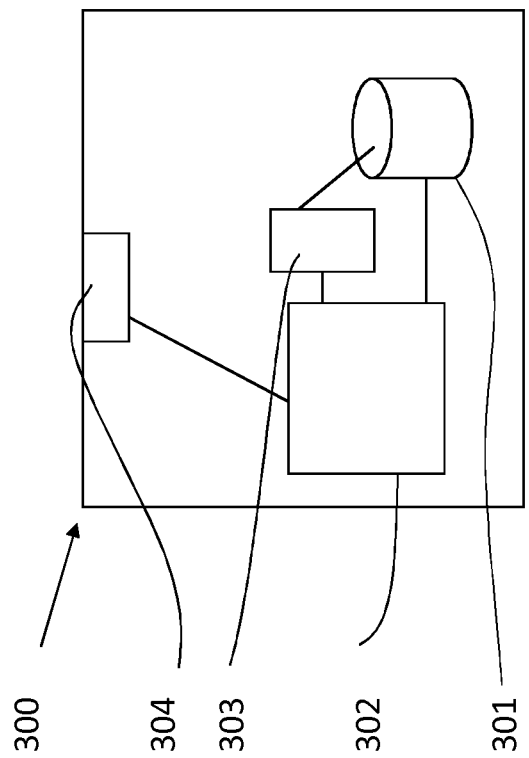
FIG. 3 shows a schematic diagram of an example network function.

An example apparatus is shown in FIG. 3. FIG. 3 shows an apparatus that could be comprised within a network function. As an example, the network function could be a base station (gNB, eNB, etc.), a management function, a serving gateway, a packet data network gateway, an access and mobility management function or a session management function. The apparatus 300 comprises at least one memory 301, at least one data processing unit 302, 303 and an input/output interface 304. For example the apparatus 300 can be configured to execute an appropriate software code to provide functions. The apparatus 300 may be included in a chipset apparatus.

Some of the example embodiments as shown below may be applicable to 3GPP 5G standards. However, some example embodiments may also be applicable to 4G, 3G and other 3GPP standards.

In 5G NR, some beams can be formed using analog beam-forming techniques, however, some systems dynamically uses analog or digital or the combination of analog and digital beam-forming called Hybrid beam-forming technique. As the cell coverage is beams based, a terminal in the 5G cell will synchronise, attach and report from a beam. Therefore, as much of 5G is beam related, 5G details a variety of beam management techniques and phases, such as (i) beam sweeping, (ii) beam measurements, (iii) beam determination, (iv) beam reporting, and (v) beam failure recovery Some examples in this disclosure relate to beam management functionality, and, in particular, to beam reporting. Some examples more specifically may relate to facilitating lower overhead and reducing latency in system operations. Currently, beam reporting in NR is based on configuring terminals with resource sets and corresponding reporting configurations using radio resource control signalling. Radio resource control signalling normally takes place at the Internet Protocol (IP) layer. Channel state information (CSI) reporting by the terminal provides a network with information on potential candidates for physical downlink control channel (PDCCH) and/or physical downlink shared channel (PDSCH) beams. CSI reporting may use a variety of metrics for measuring the quality/state of channel. For example, one example of a measurement metric is layer 1 reference signal received power (L1-RSRP). It is understood that this is just one of multiple types of measurement metric that may be used. The actual measurement metrics used for later CSI reporting may be defined by an operating communication protocol, such as 5G NR. A telecommunications engineer may have some freedom in selecting the exact measurement metrics used for later CSI reporting. Beam failure detection and recovery is triggered when all the reference signals (RS) are considered to be in a failure condition.

Figure 4:
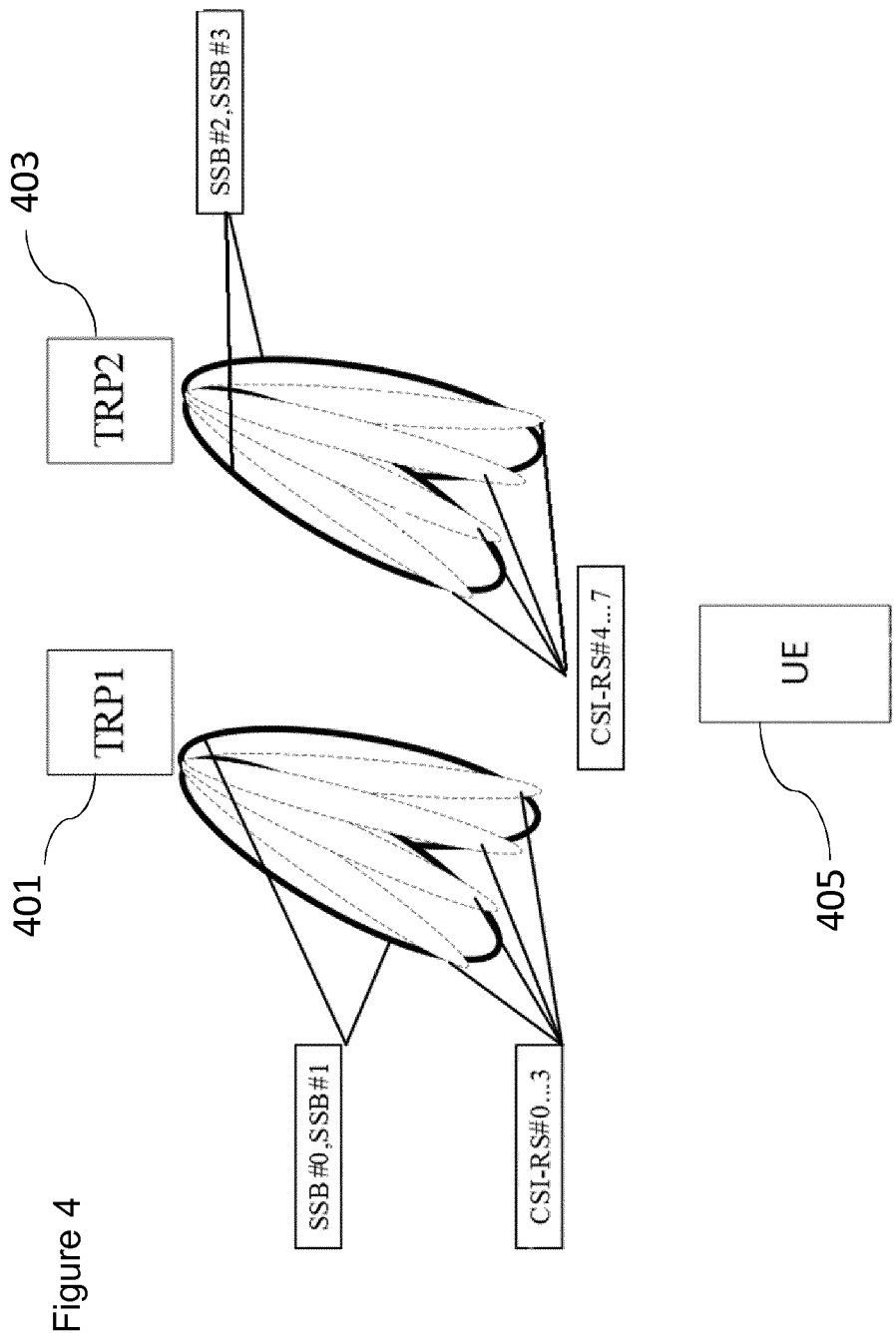
FIG. 4 schematically shows an example of reporting configurations.

FIG. 4 schematically shows an example of reporting configurations in an example deployment scenario of a wireless network. In this example, there is illustrated two transmit/receive points (TRPs) 401, 403 (i.e. base station, gNB etc.) that are configured to transmit synchronisation signal blocks (SSBs) and CSI-RS signals. These signals may be used to make measurements on for beam management purposes. TRPs 401, 403 and the signals transmitted by TRPs may cover a cell, part of the cell, or cover one or more cells. One TRP may transmit one or more SSB, and may transmit one or more CSI-RS. TRPs 401, 403 may be identified by respective identifiers (ID) at least locally specific to TRP 401, 403. In other examples, the TRPs 401, 403 may not be identified and a TRP 401, 403 associated to a specific downlink (DL) RS may not be explicitly visible to terminal. In this particular example of FIG. 4, TRP1 401 transmits SSB #0 and SSB #1 as well as CSI-RS #0, CSI-RS #1, CSI-RS #2 and CSI-RS #3. TRP2 403 transmits SSB #2 and SSB #3 as well as CSI-RS #4, CSI-RS #5, CSI-RS #6 and CSI-RS #7. A terminal 405 may be configured to detect these signals transmitted from TRP1 401 and TRP2 403, and measure one or more characteristics of the signal, for example signal strength, received power etc.

Figure 5:
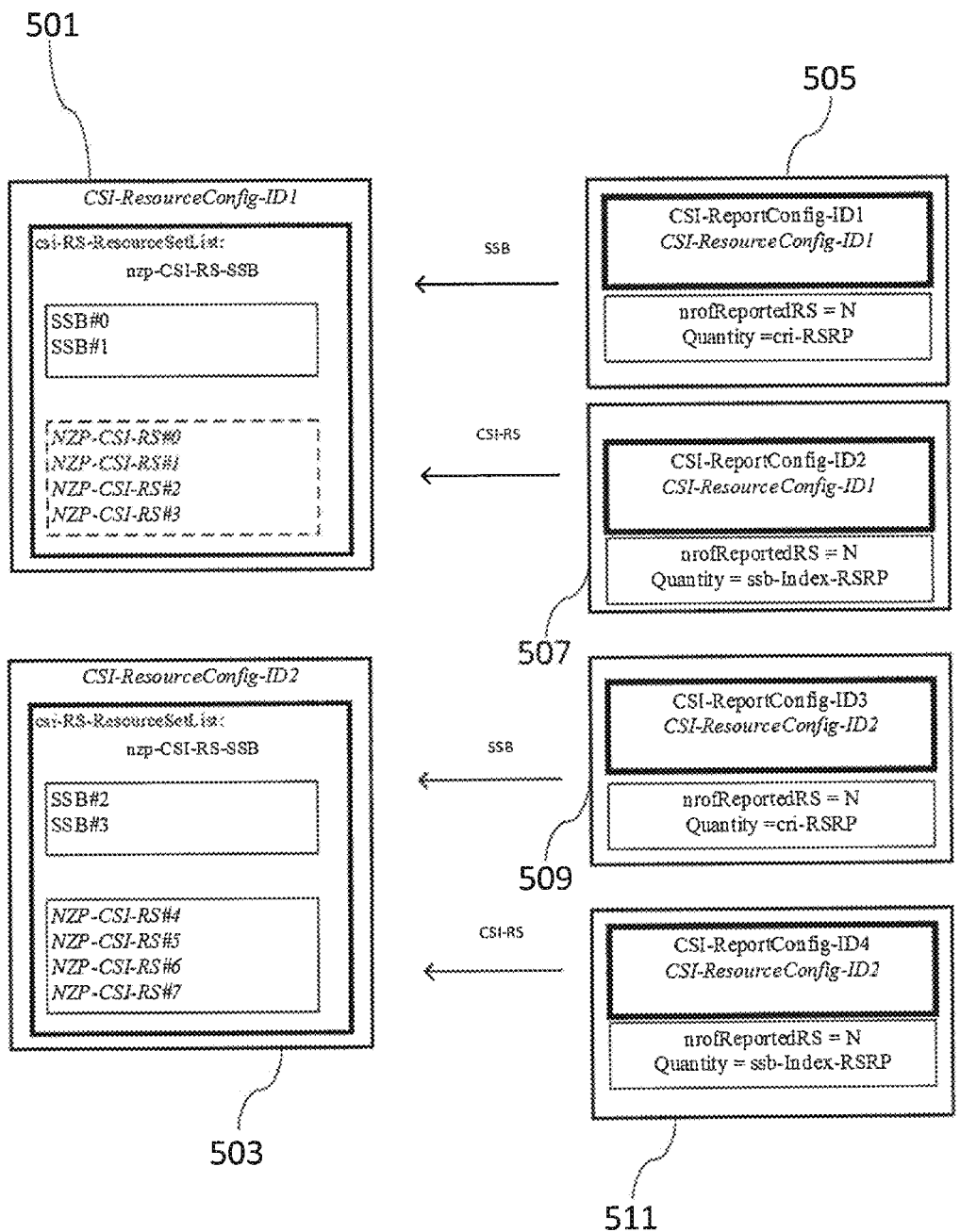
FIG. 5 schematically shows example resource and report configurations for user equipments.

In an example related to the beam management reporting in the scenario shown in FIG. 4, there is provided example resource and report configurations for terminals shown in FIG. 5. In the example of FIG. 5, a terminal has been configured with CSI-ResourceConfig-ID1 501 and CSI-ResourceConfig-ID2 503. A network may have provided the terminal with these configurations. CSI-ResourceConfig-ID1 501 and CSI-ResourceConfig-ID2 503 represent two different resource sets for beam measurements. These sets may include SSB and/or non-zero power CSI-RS (NZP-CSI-RS) signals. The network may configure specific DL RSs to be so called TRS signals (Tracking Reference signals). For CSI-ResourceConfig 501, 503 the network may configure one or more reporting settings or reporting configurations 505, 507, 509, 511 (CSI-ReportConfig) associated with specific CSI-ResourceConfig. In FIG. 5, there are four CSI-ReportConfig labelled CSI-ReportConfigID1 505, CSI-ReportConfigID2 507, CSI-ReportConfigID3 509 and CSI-ReportConfigID4 511. In this example, the network has configured the terminal with a CSI-ResourceConfig for both the SSB and CSI-RS reporting. CSI-ReportConfigID1 505 is configured for reporting SSB and is related to CSI-ResourceConfigID1 501, while CSI-ReportConfigID2 507 is configured for reporting CSI-RS and is also related to CSI-ResourceConfigID1 501. CSI-ReportConfigID3 509 is configured for reporting SSB and is related to CSI-ResourceConfigID2 503, while CSI-ReportConfigID4 511 is configured for reporting CSI-RS and is also related to CSI-ResourceConfigID2 503. These configurations may be updated by the network. The configurations may be updated using RRC signalling. The configurations may be updated using the signalling procedure detailed herein.

FIGS. 6a and 6b schematically show another example resource and report configuration for a terminal. In the example of FIG. 6a, the network has configured/activated a first transmission configuration indication (TCI) state 601 in the terminal. This TCI state may be configured for, for example, PDCCH reception. TCI may be comprised within downlink control information (DCI) and may be used to signal the applied transmission beam from the TRP to the terminal (for example, in the form of a DL RS).

As can be seen in FIG. 6a, the active first TCI state 601 corresponds to the NZP-CSI-RS identifier #2. To obtain CSI information on, specifically, the CSI-RS #2, the network has configured the terminal with CSI-ResourceConfig-ID3 603 containing the NZP-CSI-RS #2 and corresponding reporting configuration CSI-ReportConfig-ID5 605. This resource and reporting configuration of the terminal may be performed by the network using RRC signalling.

In FIG. 6b, the network has configured/activated a second TCI state 607 and a third TCI state 609 for the terminal, so that the network will receive CSI reporting specifically on those DL RS corresponding to the second and third TCI States 607, 609. As can be seen from FIG. 6b, the active second TCI state 607 corresponds to the NZP-CSI-RS identifier #1, and the active third TCI state 609 corresponds to the NZP-CSI-RS identifier #6.

The network updates the configuration in the terminal such that the resource configuration CSI-ResourceConfig-ID3 603 is updated to contain NZP-CSI-RS #1 and NZP-CSI-RS #6, and the reporting configuration CSI-ReportConfig-ID5 605 is updated to show that two DL RSs will be reported rather than one in FIG. 6a. The network may update the terminal configuration to match the current TCI States using RRC signalling.

In NR, a terminal may be configured with set of RS resources (CSI-RS and/or SSB) for measuring and reporting beam strengths (in terms of RSRP, RSRQ, SINR or the like). To minimize higher layer reconfiguration signalling of beam resources to be measured and reporting, the gNB may need to configure the terminal with high number of beams (e.g. 64) for L1-RSRP reporting. However, when having the terminal configured with a large number of L1-RSRP resources to be measured it may not be possible for the gNB to further limit the L1-RSRP measurements by the terminal to perform targeted L1-RSRP beam measurement and reporting. For example, it may not be possible to limit measurement and reporting to the current active/candidate beams without introducing high signalling overhead.

Beam management for downlink signals and channels in NR may use a TCI framework. The terminal can be configured with multiple TCI states. RRC signalling or medium access control address (MAC) commands may be used to configure the terminal with an active set of TCI states. DCI signalling may be used to indicate a certain TCI state that is to be applied for a given target signal or channel. TCI states can be configured with one or more reference signals (RSs) that act as source quasi co-location (QCL) wise (i.e. RSs act as QCL sources for a wanted target signal or channel). The 3GPP definition of QCL is that two antenna ports are said to be quasi co-located if properties of the channel over which a symbol on one antenna port is conveyed can be inferred from the channel over which a symbol on the other antenna port is conveyed.

There are four different QCL types: A, B, C and D. QCL type D is a spatial reception relation parameter. An RS that is acting as a QCL type D source for the certain target signal or channel, defines the used transmit characteristic for the signal/channel and thus indicates that terminal may use the same receive beam/spatial RX filter for receiving.

Beam indication for PDCCH and PDSCH can be summarised as follows. Regarding PDCCH, a terminal can be configured using RRC signalling with up to, for example, 64 or 128 TCI states for a control resource set (CORESET) where the states may have one RS to provide a spatial domain parameter. In other words, the states may have a single RS that characterizes the transmit beam or transmit assumptions and thus, correspondingly, the terminal reception beam. The RS may be an SS/PBCH block or a CSI-RS. The CORESET defines time and frequency resources where the terminal may search for PDCCH candidates (PDCCH may be transmitted using different aggregation levels (ALs) and thus terminal needs to search PDCCH on configured and activated CORESET(s) trying different ALs). One TCI State per CORESET may be active at one time and to activate a certain CORESET TCI state the base station (e.g. gNB) may configure the terminal with a MAC control element (MAC CE) including the TCI state activation command. A terminal may be configured with up to three CORESETs. In other examples, a terminal may be configured with less than 3 or more than 3 CORESETs. CORESET 0 may be used for scheduling both broadcast and unicast traffic to the terminal. Separate spatial domain parameter configuration and activation signalling may be provided for the CORESETs. Regarding PDSCH, a terminal can be configured using RRC signalling with up to, for example, 64 TCI states wherein the states may have one RS to provide a spatial domain parameter, i.e. to characterize the transmit beam and thus correspondingly the terminal reception beam. Furthermore, a MAC CE activation command may be used to select up to, for example, eight TCI states, and from the eight TCI states, one can be dynamically indicated by DCI when scheduling the PDSCH.

DCI to schedule DL PDSCH, may be transmitted in the PDCCH. DCI format 1_1 may be used for the scheduling of PDSCH in one cell. Transmission configuration indication (TCI) information may be transmitted by means of DCI format 1_1 such that the TCI may be 0 bits if the higher layer parameter "tci-PresentInDCI" is not enabled, otherwise the TCI may be 3 bits.

TCI in DCI may be used to signal the applied transmission beam (in the form of DL RS) used for the PDSCH transmission.

For determining the transmit beam for the PDCCH it has been proposed that the CORESETs may be associated to one or more TCI states. In a case where the CORESET is associated with more than one TCI state, MAC-CE level activation signalling may be used to control which one of the multiple TCI states may be active at one time per CORESET. Search space set related parameters associated to the CORESET may define time domain monitoring pattern from which the terminal knows when to monitor certain CORESET. From an associated (active) TCI state of the CORESET the terminal may know how to set its reception beam. Table 1 provides an exemplary TCI table configuration for a terminal, wherein QCL type A refers to Doppler spread, Doppler shift, delay spread, average delay and QCL type D refers to spatial RX filter assumption for reception.

TABLE 1

Example TCI table configuration for a user equipment

| TCI index | Source RS set | Source RS index | QCL type |
|---|---|---|---|
| 0 | RS set #A | SS/PBCH block #n (of set #A) | A + D |
| 1 | RS set #B | TRS #b (of set #B) | A |
|  |  | CSI-RS #c (of set #B) | D |
| ... | ... | ... | ... |
| M-1 | RS set #E | CSI-RS #b (of the set #E) | A + D |

Therefore, as per Table 1, when TCI index 0 determines source RS(s) for a certain physical signal or channel, the terminal can determine that it can set its reception beam as it is set for receiving the SS/PBCH block #n (see "Source RS Index" column). Correspondingly, when TCI index 1 determines source RS(s) for a certain physical signal or channel, the terminal can determine that it can set its reception beam as it is set for receiving the CSI-RS #c (of RS set #B) (see "Source RS Index" column).

The inventors have realised that problems lie in high signalling overhead of some beam management frameworks. For example, there is a large amount of signalling overhead when the network configures L1-RSRP reporting for a specific set of CSI reference signals (CSI-RSs) or synchronisation signals (SS)/physical broadcast (PBCH) blocks to be measured and evaluated for beam reporting. In this example, the beam reporting configurations are signalled using RRC which can be heavy procedure in terms of large signalling overhead and with a relatively big latency. This effect is increased for 5G NR as the measurement configurations can be dynamically adapted by the network to amend the reported set according to a time varying parameter.

Some of the following examples aim to address some of the problems that have been previously identified. Some examples aim to reduce the configuration overhead for the network and reduce the overhead of beam reporting by updating the beam reporting configuration at the terminal itself rather than being reconfigured by the network using RRC signalling.

In some examples, there are beam reporting methods wherein a reported set (NZP-CSI-RS/SSB resource indicator/indexes) are implicitly determined by a terminal and are included in the reported set based on activated TCI states for PDCCH/PDSCH.

Figure 7:
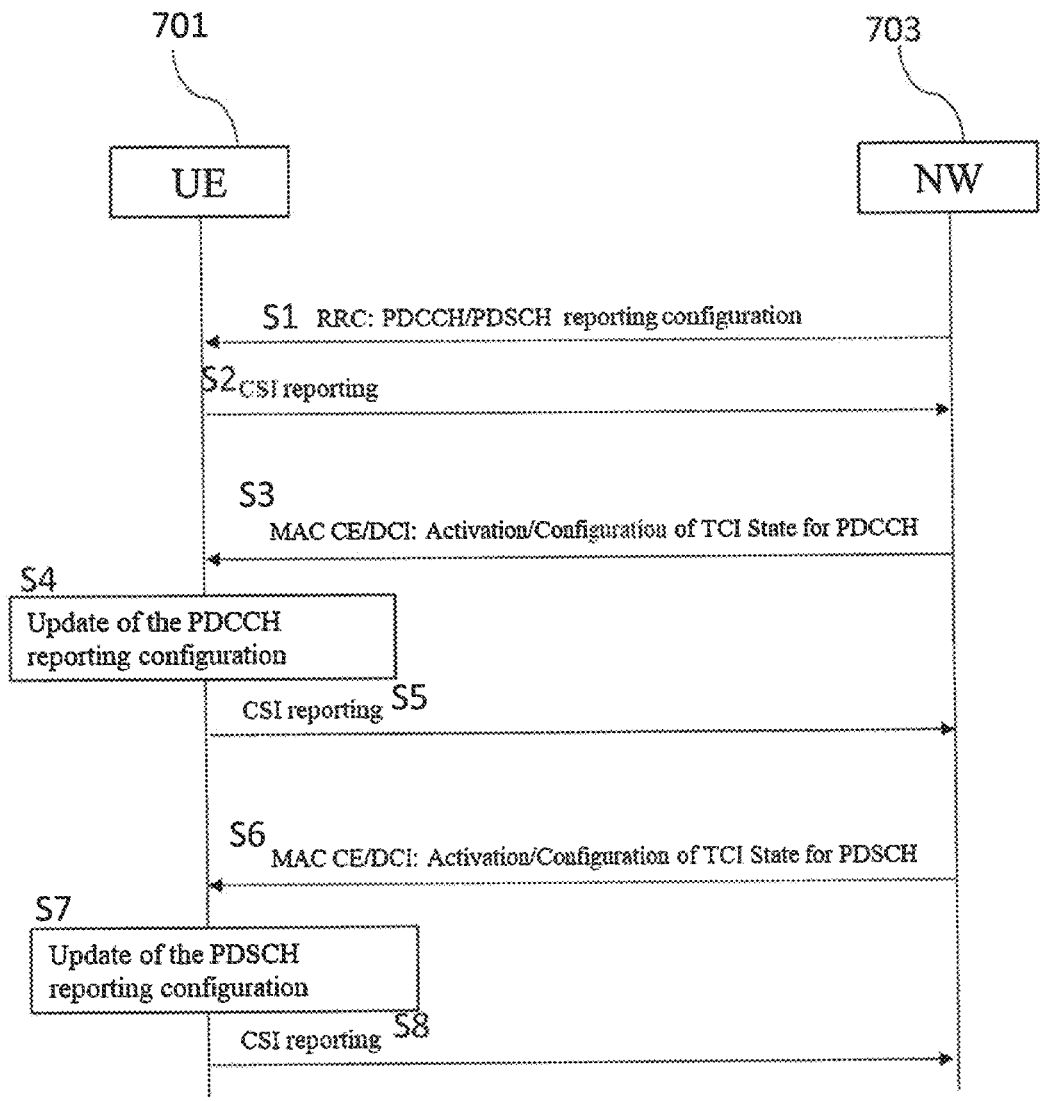
FIG. 7 shows an example signalling diagram between a user equipment and a network.

FIG. 7 shows an example signalling diagram between a terminal 701 and a network (network) 703. The network 703 could be any suitable network entity, such as for example, a base station. In FIG. 7 a CSI reporting configuration is updated at the terminal 701 based on an activation of one or more TCI States for PDCCH and/or PDSCH.

At step 1, the terminal 701 may store a PDCCH and/or PDSCH reporting configuration. The PDCCH and/or PDSCH reporting configuration may be for reporting on downlink reference signals, wherein a downlink reference signal corresponds to a TCI state. The reporting configuration may be for the terminal 701 to provide channel state information to the network 703. The network 703 may configure the terminal 703 using RRC signalling. 1. The configuration may define a reporting set for the terminal 701, wherein the reporting set shows the SSB and or CSI-RS that the terminal is reporting on to the network 703. The reported information may be determined based on the currently activated TCI States for PDSCH and/or PDSCH.

The stored PDCCH and/or PDSCH reporting configuration may be received from the network 703. The terminal 701 may receive this configuration for CSI reporting using the RRC protocol/

The stored PDCCH and/or PDSCH reporting configuration may be an altered version of a PDCCH and/or PDSCH reporting configuration previously received from the network 703. The terminal 701 may receive this previous configuration for CSI reporting using the RRC protocol.

The stored PDCCH and/or PDSCH reporting configuration may be pre-stored in the terminal prior to the terminal communicating with an access point to which the measurement report is to be made.

In some examples, the reporting may be aperiodic (i.e. one shot reporting) semi-persistent or periodic. The reporting setting may be activated immediately after the configuration is received by the terminal 701, or the network 703 may trigger this specific reporting configuration using lower layer signalling (e.g. MAC CE, DCI). In this example, the network 703 configures the terminal 701 to periodically report CSI information on activated TCI States for PDCCH and/or PDSCH upon receiving the configuration.

For both aspects of PDSCH/PDCCH reporting, the terminal may prepare a measurement report, and then report to the network in the beginning of (or during) an on-duration when periodic reporting is configured. The terminal may report the measurement report in the PUSCH according to a first uplink grant. A special field in DCI may also trigger a TCI state specific measurement report from the terminal to the network.

At step 2, the terminal 701 transmits a first CSI report to the network 703. The reporting channel (uplink) that the terminal 701 may use to report may be any one of PUCCH, PUSCH, and MAC CE. In some examples, the terminal 701 may not transmit a first CSI report to the network 703 at this point. The terminal 701 may be configured with, for example, aperiodic reporting and will transmit a CSI report when triggered by the network.

In an example, for the terminal there are configurable trigger conditions to initiate Uplink Control Information (UCI)/MAC-CE based CSI (such as L1-RSRP and/or L1-SINR) reporting on PDSCH/PDCCH. For example, when at least N out of M reported DL RS are below threshold value. The terminal may trigger a scheduling request (SR)/random access channel (RACH) and includes the UCI/MAC CE in the uplink (UL) grant or determine whether the periodic report is omitted (implicit indication that for example, CSI are above a predetermined threshold).

At step 3, the network 703 activates a first TCI state for PDCCH. The network 703 may activate the first TCI state and indicate this to the terminal 701 using MAC CE/DCI signalling. By activating the first TCI state for PDCCH, the network 703 is activating a new PDCCH beam for the terminal 701.

When the network activates a new TCI State for PDCCH/PDSCH, in some examples this may deactivate the old activated TCI state. In some examples, the TCI state remains activated until deactivated. The terminal may implicitly update the reporting set accordingly by including the RS corresponding to the newly added/or activated TCI state and removing the RS corresponding to the old TCI from the configuration which has been deactivated. In one example, the network may activate a TCI state for PDCCH/PDSCH reception in addition to current TCI states. In response, the UE may update the reporting configuration. In some examples, the network may deactivate a TCI state while other active TCI states remain active. In response, the UE may update the reporting configuration.

At step 4, the terminal 701 updates the reporting set based on the activated first TCI state for PDCCH. The terminal 701 may update the reporting set to include a downlink reference signal corresponding to the activated first TCI state received from the network 703. In one example, the terminal 701 may include in the reporting set the CSI-RS/SSB that is quasi co-located (or is the QCL source RS) with the RS corresponding to the activated TCI State. In an example, the CSI report may in one configuration comprise SS/Blocks indexes/CSI-RS resource indicators and CSI information (such as L1-RSRP and/or L1 signal-to-interference-plus-noise ratio (L1-SINR) values) that are the spatial QCL source(s) for the activated TCI states for PDCCH/PDSCH.

When the terminal 701 updates the reporting set according to the received activated first TCI state, the terminal 701 may also deactivate the previously activated one or more TCI states for PDCCH in the reporting set. In other examples, the activated TCI state may not deactivate the previously activated state in the reporting set. In this case of a TCI state for PDCCH, the PDSCH reporting setting may be unaffected. The terminal 701 may not require any RRC level update or any other activation by lower layers to update the CSI reporting configuration.

At step 5, the terminal 701 transmits a second CSI report to the network 703. The report may include measurements of the reference signal corresponding to the activated first TCI state.

At step 6, the network 703 activates a second TCI state for PDSCH. The network 703 may activate the second TCI state and indicate this to the terminal 701 using MAC CE/DCI signalling. By activating the second TCI state for PDCCH, the network 703 is activating a new PDSCH beam for the terminal 701.

At step 7, the terminal 701 updates the reporting set based on the activated second TCI state for PDCCH. The terminal 701 updates the reporting set to include a downlink reference signal corresponding to the activated second TCI state received from the network 703. In one example, the terminal 701 may include in the reporting set the CSI-RS/SSB that is quasi co-located with the RS corresponding to the activated TCI State. When the terminal 701 updates the reporting set according to the received activated second TCI state, the terminal 701 may also deactivate the previously activated one or more TCI states for PDSCH in the reporting set. In this case of a TCI state for PDSCH, the PDCCH reporting setting may be unaffected. The terminal 701 may not require any RRC level update or any other activation by lower layer to update the CSI reporting configuration.

At step 8, the terminal 701 transmits a third CSI report to the network 703. The report may include measurements of the reference signal corresponding to the activated second TCI state.

In an example scenario, the TCI states may be configured and activated for PDCCH and/or PDSCH reception and transmission of PUCCH and/or PUSCH. In some cases, the uplink channels may not be configured using the TCI state or TCI state framework and the channel (PUSCH/PUCCH) transmission may be configured using a downlink reference signal as a reference. In one example, a UE may be configured to transmit on an uplink channel using a DL RS as a spatial reference. The UE may transmit the uplink channel using the same (or similar, or any or corresponding) spatial filter that the UE used to receive the DL RS. These examples are non-limiting. The UE may also determine uplink transmission characteristics (such as, for example, spatial transmission characteristics) for PUCCH or PUSCH based on other uplink signals such as an SRS (sounding reference signal). The SRS may have a reference to a DL RS. In some examples, the DL RS that can be considered as a reference for the transmission of an uplink channel, may be used in a reporting configuration as described herein.

In an example scenario, a reporting configuration and reported beams may be determined based on a CORESET basis. As an example, grouping of CORESETs may be used for beam reporting purposes. Specific sets of CORESETs may be grouped together and may be used by a UE to report the active TCI states in the same reporting configuration/beam report of the same CORESET group. The CORESET group may be associated to a TRP. In other examples, the CORESET may be associated with a set of TRPs. In some cases, if a TRP ID is visible to a UE, then the UE may group the associated CORESETs per TRP ID. The UE may determine the reported DL RS based on the activated TCI states for the CORESETs in the same group. In one example, the set of TRPs may also be grouped. The UE may decide to group the respective CORESET and determine the reporting configuration. The UE may determine the reporting configuration based on the TRP/CORESET grouping. A network may trigger the UE to report beams specific for set of TRP/CORESETs. The UE may determine the reported content based on the reporting channel that is used. As an example, PUCCH may be transmitted to a specific TRP or CORESET group. The UE may implicitly determine the reporting content based on the associated TCI States.

In an example, for PDSCH/PDCCH beam reporting, a bitmap based reporting may be configured. A bitmap length may be determined by the number of activated TCI states for PDCCH or PDSCH. The activated TCI States may be reported in a bitmap using an ascending (or descending) order of the (activated) TCI State index numbers. PDSCH/PDCCH TCI states may be associated with one or more bits. PDSCH/PDCCH may have separate or same reporting configurations (similarly as PUSCH or PUCCH). The network may configure the terminal with one or more threshold levels corresponding to the number of bits used. The thresholds may be CSI thresholds such, for example, as L1-RSRP and/or L1-SINR. In an example, when the terminal is configured to report, the terminal triggers a bitmap based reporting based on the activated TCI states for PDSCH using one bit per TCI State. For example, an 8-bit bitmap may be used, when reporting information on PUCCH/PUSCH. As an example, the bitmap length may also be determined based on the maximum number of TCI states that can be active for respective channel (PDCCH, PDSCH, PUCCH, PUSCH). One bit in a bitmap may indicate whether a PDSCH status is above threshold value (for example, L1-RSRP and/or L1-SINR). In an alternate example, for PDCCH, up to a 3 bit bitmap on PUCCH may be used, wherein one bit indicates whether a PDCCH status is above threshold value (L1-RSRP and/or L1-SINR or other CSI threshold). Alternatively, the terminal may report CSI such as L1-RSRP values of active TCI states in ascending/descending order of the CORESET IDs (that the active TCI states are associated) or TCI State IDs of the PDCCH/PDSCH TCI States. In some cases, the ID or IDs themselves may not be reported. In an example, the terminal may be configured to report the downlink RS corresponding to the PUCCH/PUSCH beam if, for example, the network configures the terminal's uplink beam based on downlink reference signals.

It should be understood that the steps shown in FIG. 7 may be performed in different orders. In other examples, some steps may not be required.

Figure 8:
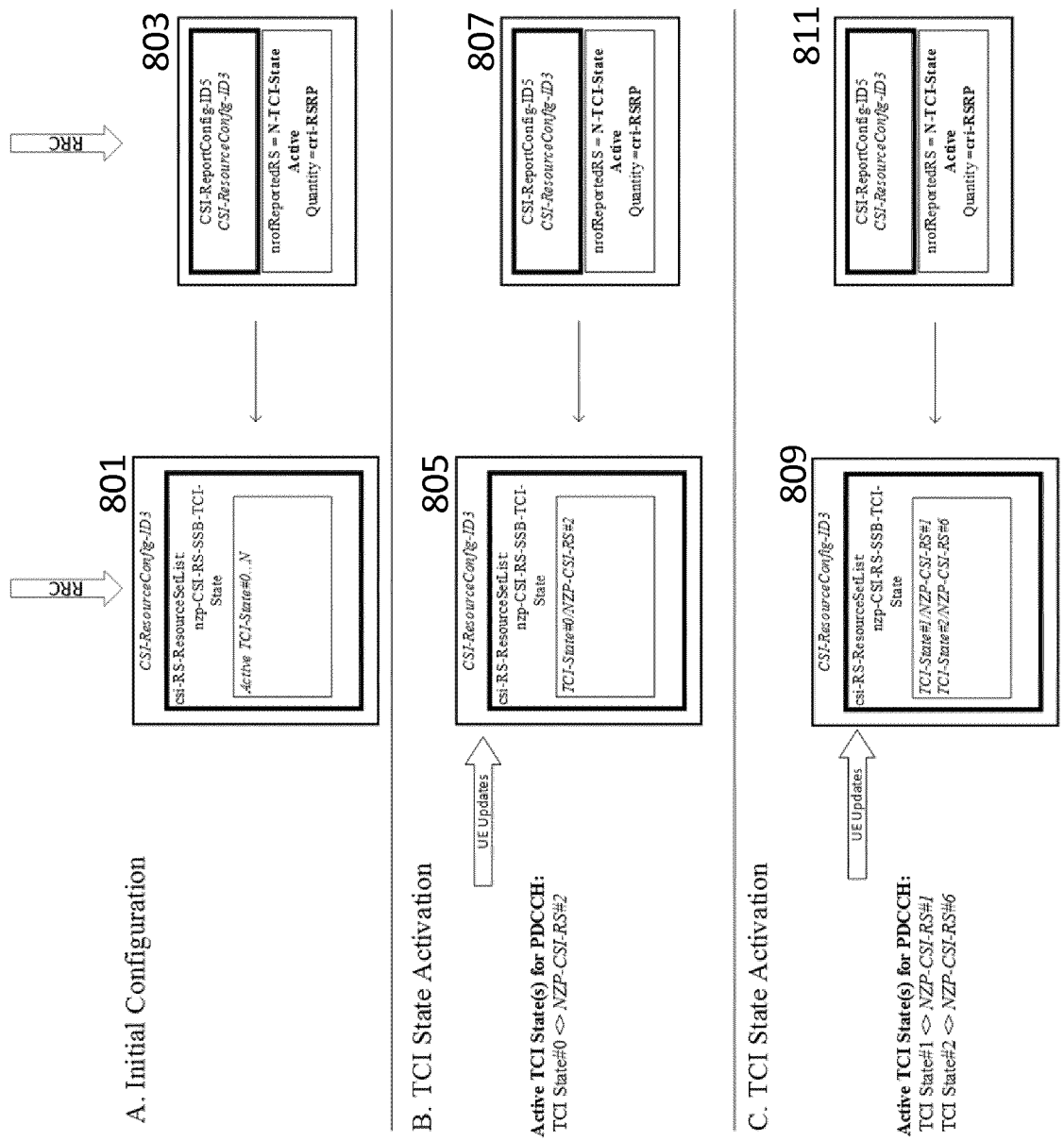
FIG. 8 schematically shows an example of updating a resource and reporting configuration for beam reporting at a user equipment.

FIG. 8 schematically shows an example of updating a resource configuration and a reporting configuration for beam reporting at a user equipment.

In part A of FIG. 8, there is an initial reporting configuration of the terminal. In this example, the terminal is configured with CSI-ResourceConfig-ID3 801 and CSI-ReportConfig-ID5 803. The network may configure the terminal with these initial reporting configurations using RRC signalling. The CSI-ReportConfig-ID5 803 may be used for reporting CSI on DL RS corresponding to the active TCI states for PDCCH and/or PDSCH. The reporting configuration, CSI-ReportConfig-ID5 803, may limit the number of reported TCI states. The reporting configuration, CSI-ReportConfig-ID5 803, may indicate specific TCI State index numbers. The reporting configuration, CSI-ReportConfig-ID5 803, may indicate a reporting set to be included in the CSI report. The number of reported RS may also be dynamically changed based on the number of activated TCI states. The resource configuration, CSI-ResourceConfig-ID3 801, may be updated to include the activated TCI state index numbers, or up to an 'N' index, or a set of TCI index numbers.

In part B of FIG. 8, the terminal has received an indication of an activated TCI state for PDCCH. The terminal may receive the indication with MAC CE/DCI signalling from the network. In other examples, other suitable types of signalling may be used. In the example of FIG. 8 part B, the activated state is TCI state #0. The TCI state #0 corresponds to NZP-CSI-RS #2. NZP-CSI-RS may be a spatial/QCL reference for the PDCCH reception. The terminal can update the initial reporting configuration to provide an updated CSI-ResourceConfig-ID3 805. The terminal may also determine an updated CSI-ReportConfig-ID5 807. Upon activation terminal of the TCI state, the terminal may update the reporting configuration to include the DL RS corresponding to the active TCI state. In some examples, the network can configure the terminal to include, for example, the source QCL reference of the active TCI State which may be another CSI-RS or SSB signal. Therefore, the update of the terminal configuration is a terminal internal procedure and network signalling for an update may not be required.

In part C of FIG. 8, the terminal has received another indication with two activated TCI states for PDCCH. The terminal may receive the indication with MAC CE/DCI signalling from the network. In other examples, other suitable types of signalling may be used. As can be seen in part C, the activated TCI states are shown as TCI state #1 and TCI state #2. TCI state #1 corresponds to NZP-CSI-RS #1, while TCI state #2 corresponds to NZP-CSI-RS #6. The terminal updates the resource configuration, CSI-ResourceConfig-ID3 809, to include the active TCI states #1 and #2. The terminal also updates the CSI-ReportConfig-ID5 811. In this example, CSI-ReportConfig-ID5 811 will be updated such that the number of reported RS is increased to two, as two TCI states are now active (TCI state #1 and #2).

Figure 6:
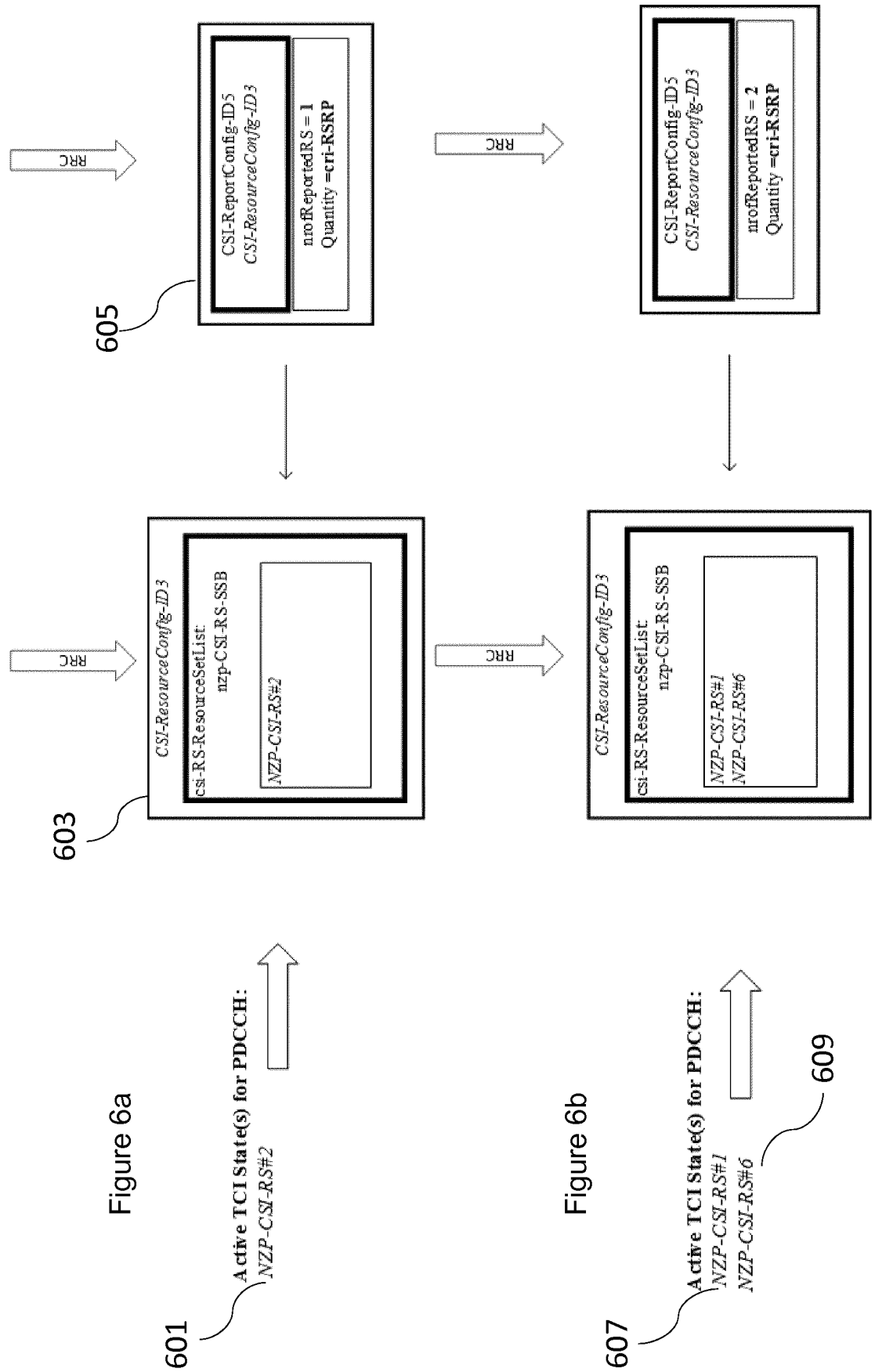
FIGS. 6*a* and 6*b* schematically shows another example resource and report configuration for user equipments.

FIG. 8 shows the same updates to CSI-ResourceConfig-ID3 as in FIG. 6 i.e. firstly TCI state #0 is activated, and then TCI state #1 and #2 are activated (which will deactivate TCI state #0). In FIG. 6 the updates to CSI-ResourceConfig-ID3 may be performed with RRC signalling from the network. In FIG. 8, the terminal receives MAC-CE/DCI signalling of the activated TCI state, and then the terminal itself updates the CSI-ResourceConfig-ID3 according the active TCI states. In the open systems Interconnection (OSI) model, RRC is layer 3 (network layer) while MAC is layer 2 (data link layer). This reduction in higher layer RRC signalling from the network may reduce the overhead for beam management for the network.

Even though the examples shown in FIG. 8 show activated TCI states for PDCCH, in other examples the activated TCI states may be for PDSCH.

As shown in FIG. 7 and FIG. 8, a terminal is able to update its own configuration for its reporting set based on the activated one or more TCI states rather than having the network to update the configuration when the TCI state changes using RRC signalling. RRC signalling from the network may use significant network resources and processing resources of the terminal. Therefore, having a terminal update the measurement reporting using implicit signalling at a lower level than the RRC level may reduce the configuration overhead of the network and the processing performed by the terminal. This may also reduce the overhead for beam reporting at the terminal.

Figure 9:
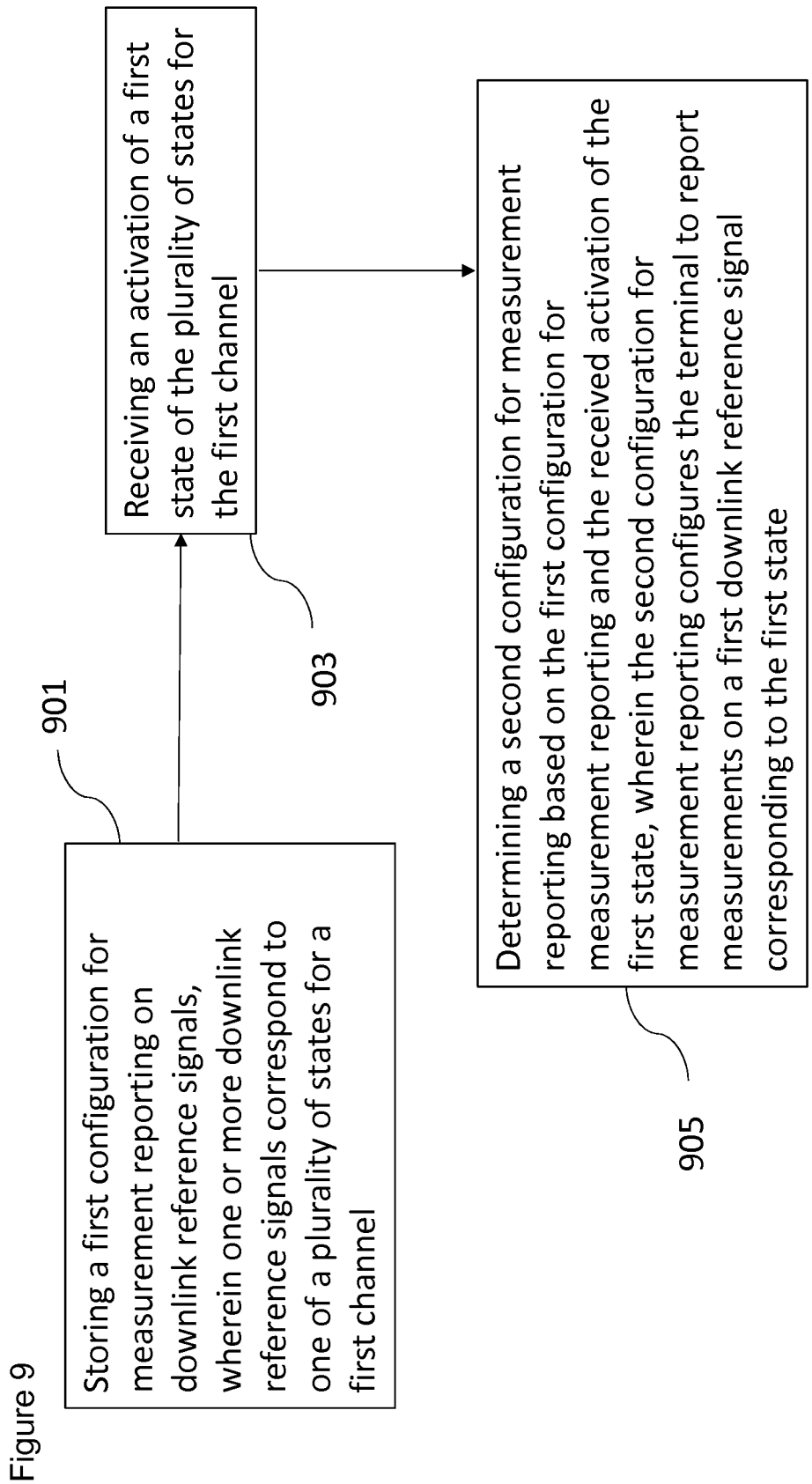
FIG. 9 shows an example method flow diagram.

FIG. 9 shows an example flow diagram showing method steps. The method steps may be performed by an apparatus. The apparatus may be comprised within a terminal device.

Step 901 comprise storing a first configuration for measurement reporting on downlink reference signals, wherein one or more downlink reference signals correspond to one of a plurality of states for a first channel.

Step 903 comprises receiving an activation of a first state of the plurality of states for the first channel.

Step 904 comprises determining a second configuration for measurement reporting based on the first configuration for measurement reporting and the received activation of the first state, wherein the second configuration for measurement reporting configures the terminal to report measurements on a first downlink reference signal corresponding to the first state.

The method steps may be performed in different orders. Some method steps may not need to be performed.

Figure 10:
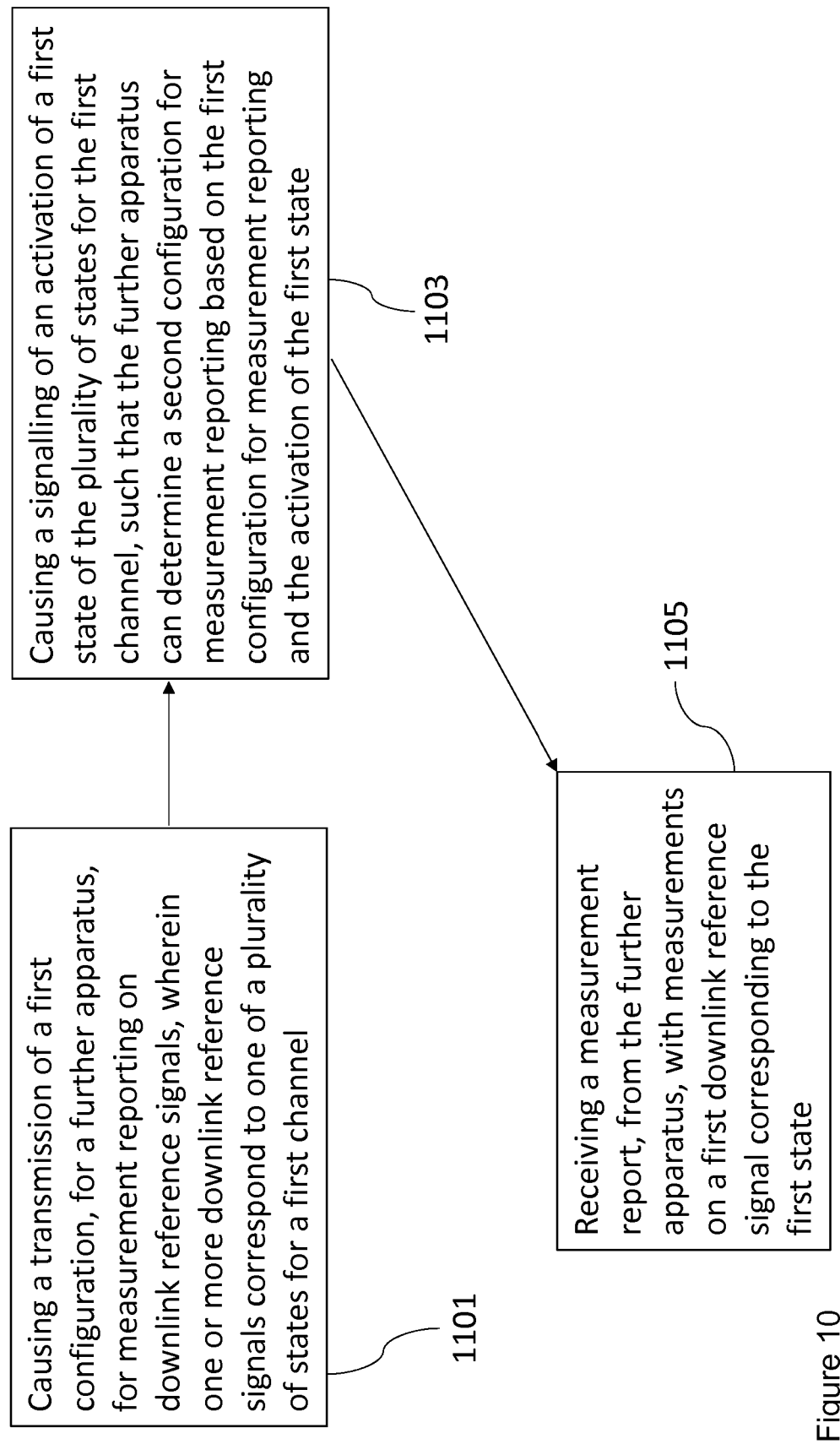
FIG. 10 shows another example method flow diagram.

FIG. 10 shows an example flow diagram showing method steps. The method steps may be performed by an apparatus. The apparatus may be comprised within a network entity.

Step 1001 comprises causing a transmission of a first configuration, for a further apparatus, for measurement reporting on downlink reference signals, wherein one or more downlink reference signals correspond to one of a plurality of states for a first channel.

Step 1003 comprises causing a signalling of an activation of a first state of the plurality of states for the first channel, such that the further apparatus can determine a second configuration for measurement reporting based on the first configuration for measurement reporting and the activation of the first state.

Step 1005 comprises receiving a measurement report, from the further apparatus, with measurements on a first downlink reference signal corresponding to the first state.

The method steps may be performed in different orders. Some method steps may not need to be performed.

The method steps may be performed by an apparatus. The apparatus may be comprised within a communication device, such as a terminal configured to access a communication network via an access point. In other examples, the terminal may be within the apparatus. Each method step may be performed by a different part or component of the terminal. The method steps may be performed by an apparatus, such as chipset or IC, within the terminal. It is to be understood that one or more steps may be omitted or take place in an alternate order.

It should be understood that each step in the signalling diagram of the Figures and any combination thereof may be implemented by various means or their combinations, such as hardware, software, firmware, one or more processors and/or circuitry.

It is noted that whilst embodiments have been described in relation to one example of a standalone 5G networks, similar principles maybe applied in relation to other examples of standalone 3G or LTE networks. It should be noted that other embodiments may be based on other cellular technology other than 5G or on variants of 5G. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it. A non-transitory computer readable medium may comprise program instructions for causing an apparatus to perform embodiments of this invention.

Further in this regard it should be noted that any steps in the signalling diagrams as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising a processor and a memory, with the memory including computer program code, with the memory and computer program code, with the processor, configured to cause the apparatus to perform a series of steps comprising:
receiving a first configuration for measurement reporting via radio resource control (RRC) signaling;
storing the first configuration for measurement reporting on one or more downlink reference signals, wherein the one or more downlink reference signals correspond to one of a plurality of transmission configuration indication (TCI) states for a first channel, wherein the first channel comprises at least one of a physical downlink control channel (PDCCH) and a physical downlink shared channel (PDCSH), wherein the configuration includes CSI-ResourceConfig for both SSB and CSI-RS reporting;
receiving an activation of a TCI state of a plurality of states for the first channel, wherein the receiving the activation further includes an activation of an additional TCI state of the plurality of states for the first channel, and wherein the receiving the activation is via a medium access control address control element, MAC CE, and/or via a downlink control information element;
determining a second configuration for measurement reporting based on the first configuration for measurement reporting and the received activation of the TCI state, wherein the second configuration for measurement reporting configures the terminal to report measurements on a first downlink reference signal, of the one or more downlink reference signals, corresponding to the TCI state, wherein the first and second configuration for measurement reporting comprises an indication for the apparatus to report the measurement periodically to the network, when provided with a trigger from the network, and wherein the second configuration for measurement reporting configures the apparatus to report measurements on more than one downlink reference signals corresponding to the received activation of the more than one states, and wherein a third configuration includes two different resource sets for beam measurements;
causing a measurement report to be transmitted to a network, wherein the measurement report includes one or more measurements of the first downlink reference signal of the one or more downlink reference signals, wherein the one or more measurements are channel state information (CSI) measurements; and
periodically report CSI measurements on activated TCI States for PDCCH and/or PDSCH upon receiving the second configuration.

* * * * *